United States Patent [15] 3,684,977

Viles [45] Aug. 15, 1972

[54] ADJUSTABLE FREQUENCY GENERATOR EQUIPMENTS

[72] Inventor: Roger Stanley Viles, Harpenden, England

[73] Assignee: Marconi Instruments Limited, London, England

[22] Filed: Oct. 19, 1970

[21] Appl. No.: 81,978

[30] Foreign Application Priority Data

Oct. 24, 1969 Great Britain..........52,173/69

[52] U.S. Cl. ....................331/183, 331/75, 331/178, 333/15, 333/17, 334/15

[51] Int. Cl. ..............................................H03b 3/02

[58] Field of Search............331/36, 75, 77, 183, 109; 333/15, 17, 17 A

[56] References Cited

UNITED STATES PATENTS 2,413,263 12/1946 Suter..........................333/17

3,281,722 10/1966 Hellwarth....................333/17

3,588,752 6/1971 Hirshfield....................334/15

*Primary Examiner*—John Kominski
*Attorney*—Baldwin, Wight & Brown

[57] ABSTRACT

An adjustable frequency generator equipment having automatically controlled output level and low harmonic distortion comprises an adjustable R.F. oscillator, a variable bandwidth low pass filter, a detector and a comparator. The detector, at the output of the filter, provides a D.C. output proportional to the R.F. input thereto. This D.C. voltage is fed to one terminal of the comparator, and the output from the comparator controls varactor diodes in the filter, thereby automatically adjusting the upper cut-off frequency of the filter to a value close to the fundamental frequency of the oscillator. The output level of the equipment is adjusted by varying the reference voltage applied to a second terminal of the comparator.

6 Claims, 2 Drawing Figures

Figure 1:
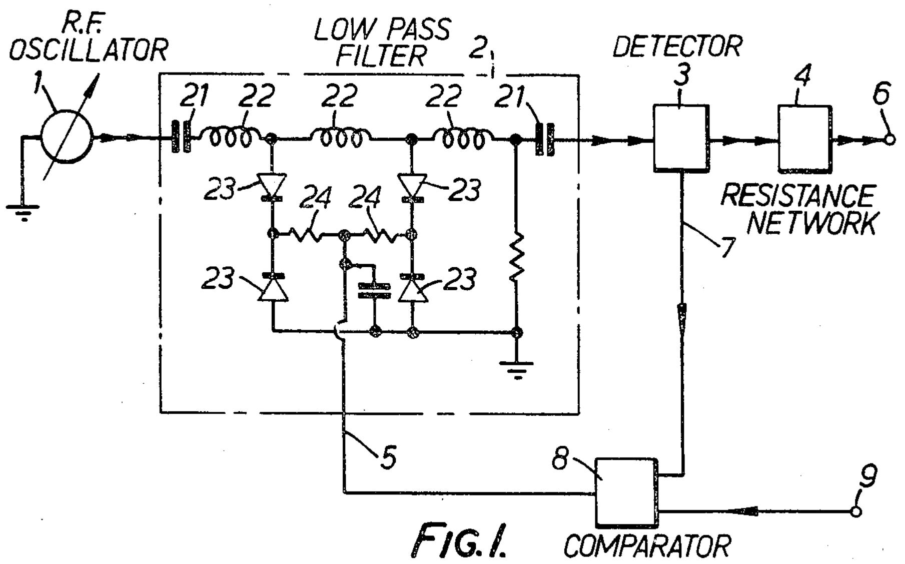

Inventor
Roger Stanley Viles
By
Baldwin, Wight & Brown
Attorneys

ADJUSTABLE FREQUENCY GENERATOR EQUIPMENTS

This invention relates to adjustable frequency generator equipments such, for example, as the radio frequency sweep generators which are commonly used for the test and measurement of performance of radio frequency apparatus.

The object of the invention is to provide improved simple and economical radio frequency sweep generators and like adjustable frequency generator equipments which shall be capable of providing, at any desired frequency within a relatively wide range of frequencies, an output of automatically controlled level and with a minimum of harmonic distortion.

According to this invention an adjustable frequency generator equipment comprises a source of oscillations of adjustable frequency, a low pass filter of adjustable upper cut-off frequency fed with oscillations from said source and means controlled in dependence upon the level of the output from said filter for automatically adjusting said upper cut-off frequency to a value which is close to the fundamental input frequency being supplied to the filter.

Because the low pass filter is automatically tuned in such a way that its upper cut-off frequency is made approximately the same as the fundamental input frequency being fed thereto, any harmonics present in the input oscillations will fall well outside the pass band of the filter. The useful output, which is taken from the filter, will therefore be of much reduced harmonic content. At frequencies above the upper cut-off frequency of the filter, attenuation of the input oscillations of fundamental frequency will occur. The higher the input frequency the greater will be the attenuation. For any given input frequency the low pass filter will act as a variable attenuator. By using this filter (as the present invention does in effect) as a controlling element for adjusting the upper cut-off frequency thereof and maintaining constant the output level thereof, that frequency can be automatically held at approximately the input fundamental frequency — in fact a little below it — if the attenuation required is a few dBs. Harmonics of the input fundamental frequency will be well outside the pass band of the filter and will therefore be very greatly attenuated.

The invention lends itself to embodiment in an adaptor unit which can be connected in cascade with an existing adjustable frequency generator to provide control of output level and reduction of harmonic content. According to a feature of this invention an adaptor, suitable for connection in cascade with an adjustable frequency generator comprises a low pass filter of adjustable upper cut-off frequency and means controlled in dependence upon the level of the output from said filter for automatically adjusting said upper cut-off frequency to a value which is close to the fundamental input frequency being supplied to the filter.

Preferably the low pass filter includes at least one reactance constituted by a varactor diode so connected therein that the upper cut-off frequency thereof is adjustable by an adjustable control D.C. bias voltage applied to said diode. In a preferred form the filter includes at least one capacitive shunt arm containing two voltage-controlled varactor diodes back to back.

Preferably output from the filter is fed to a rectifier circuit adapted to provide a D.C. output which is substantially proportional to the level of the R.F. input thereto and a comparator adapted to compare said D.C. output with D.C. voltage from a reference D.C. voltage source is employed to derive a D.C. control voltage which is applied as adjustment controlling voltage to the filter. The comparator is preferably a differential amplifier. The reference D.C. voltage source is preferably adjustable.

Figure 2:
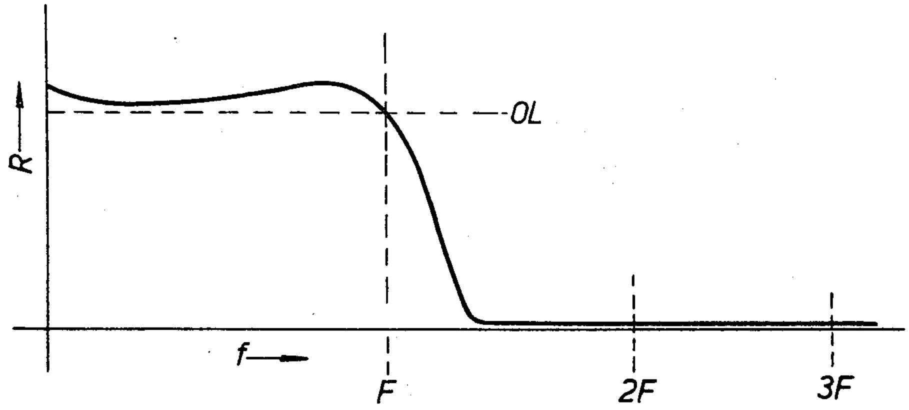

The invention is illustrated in and further explained in connection with the accompanying drawings in which:

FIG. 1 is a simplified diagrammatic representation of one embodiment of the invention, and FIG. 2 is an explanatory graphical figure.

Referring to FIG. 1 which shows one form of RF sweep generator equipment in accordance with the invention, 1 is an adjustable or variable RF oscillator of any suitable known form. Output from this oscillator is fed to a low pass filter within the chain line block 2. Any of a variety of different forms of low pass filter of controllable upper cut-off frequency may be employed but the one illustrated is simple and satisfactory. It includes, in a series arm, capacitors 21 and inductors 22, and in two shunt arms capacitors constituted by varactor diodes 23. The capacitors 21 are merely for D.C. isolation and are large enough to be of substantially no effect so far as the operating frequencies are concerned. The capacitors provided by the varactor diodes are voltage controlled to adjust the upper cut-off frequency of the filter. The control voltage is a D.C. Voltage which is supplied over lead 5 and through resistances 24 to the diodes as shown. The arrangement illustrated with two varactor diodes back to back in each shunt arm has the advantage of minimizing second harmonic distortion of the RF signal due to diode conduction when the peak value of the RF voltage approaches the DC voltage applied over lead 5.

Output from the filter is fed via apparatus in the blocks referenced 3 and 4 to the useful output terminal 6. Block 3 includes a path for forwarding the RF output from the filter 2 to block 4 which contains a resistance or resistance network (not separately shown) of any convenient known form and of predetermined value chosen to give the equipment as a whole a desired output impedance. The value of the resistance in the block 4 determines the output impedance of the equipment. Block 3 also contains any convenient circuitry known per se for producing a D.C. output proportional to the RF input. A simple diode detector (not separately shown) is quite suitable for this purpose. The frequency response of the detector should obviously be at least as good as the final RF output flatness required.

The D.C. voltage output from the detector is fed over lead 7 to constitute one input to a comparator 8 (which may conveniently be a differential amplifier), the second input to which is provided by a reference D.C. voltage source (not shown) connected at terminal 9. Preferably the voltage from the source connected at 9 is adjustable. The output from the comparator 8 (hereinafter assumed to be a differential amplifier) constitutes the control voltage which is fed over lead 5 to the diodes 23. It serves automatically to adjust the upper cut-off frequency of the filter 2 to a value close to whatever fundamental frequency the source 1 happens to be supplying. The output voltage standing wave ratio of the equipment depends on the value of the resistance in block 4 and also, in practice, on the mounting system (which will in most cases be co-axial) employed for this resistance. A figure of 1.05 at 1Gc/s is readily achievable.

If the gain of the differential amplifier were infinite, the RF output at terminal 6 would be automatically maintained at that level at which the D.C. voltage on lead 7 equalled the reference voltage applied at terminal 9. In practice the gain of the amplifier should be high enough to give the required degree of flatness. By adjusting the reference voltage applied at 9 the output level at 6 may be varied.

The input level from the generator 1 to the filter 2 should not be permitted to vary too much otherwise the attenuation required by the filter 2 to secure proper operation would be too much to be readily attainable and the attenuation of harmonics in the output at 6 would be reduced.

The more the input level from the generator 1 varies the better has to be the stop-band attenuation of the filter 2.

The differential amplifier must be designed to provide the necessary voltage swing to drive the varactor diodes 23 over the required capacity range. A typical practical value of voltage necessary for this is about 30 volts.

In some cases it may be necessary or desirable to interpose a buffer amplifier between the generator 1 and the filter 2 in order to avoid changes in filter impedance affecting the source 1 in oscillation level or frequency.

FIG. 2 graphically illustrates the attenuation effect of the filter 2. This figure is almost self-explanatory and connects filter response R (ordinates) with input frequency f (abscissae). The fundamental frequency supplied by the source 1 is shown by the broken line F, and the broken lines 2F and 3F represent the second and third harmonic frequencies. The output level of the filter is indicated by the broken horizontal line OL.

An equipment as represented diagrammatically in FIG. 1 will operate to give good control of output level and very much reduced harmonic distortion over quite a wide range of input frequencies — for example a two octave range in the VHF/UHF band.

The invention lends itself admirably to incorporation in an adaptor unit adapted to be connected in cascade with an existing adjustable frequency oscillator to provide improved level control and reduced harmonic content. Such an adaptor unit could consist of the pieces of equipment represented in FIG. 1 by the blocks 2, 3, 4 and 8, with their interconnections, and terminals for connection to the existing oscillator, to the reference D.C. source (alternatively this could be included in the adaptor unit), and to an output terminal.

I claim:

1. An adjustable generator equipment comprising a source of oscillations of adjustable frequency, a low pass filter of adjustable upper cut-off frequency fed with oscillations from said source, a rectifier circuit connected to the output of the filter which provides a D.C. output that is substantially proportional to the level of the R.F. input thereto; a comparator and a reference D.C. voltage source wherein said comparator is adapted to compare said D.C. output from the rectifier circuit with D.C. voltage from the reference D.C. voltage source to derive a D.C. control voltage which is applied as adjustment controlling voltage to the filter for automatically adjusting said upper cut-off frequency of the filter to a value lower than the fundamental input frequency supplied to the filter and for maintaining the level of the filter output at a substantially constant level, said constant level being determined by the value of the voltage from said reference D.C. voltage source.

2. An adaptor, suitable for connection in cascade with an adjustable frequency generator, said adaptor comprising a low pass filter of adjustable upper cut-off frequency fed with oscillations from said source; a rectifier circuit connected to the output of the filter which provides a D.C. output that is substantially proportional to the level of the R.F. input thereto; a comparator and a reference D.C. voltage source wherein said comparator is adapted to compare said D.C. output from the rectifier circuit with D.C. voltage from the reference D.C. voltage source to derive a D.C. control voltage which is applied as adjustment controlling voltage to the filter for automatically adjusting said upper cut-off frequency of the filter to a value lower than the fundamental input frequency supplied to the filter and for maintaining the level of the filter output at a substantially constant level, said constant level being determined by the value of the voltage from said reference D.C. voltage source.

3. Apparatus as claimed in claim 2 wherein the low pass filter includes at least one reactance constituted by a varactor diode so connected therein that the upper cut-off frequency thereof is adjustable by an adjustable control D.C. bias voltage applied to said diode.

4. Apparatus as claimed in claim 3 wherein the filter includes at least one capacitative shunt arm containing two voltage-controlled varactor diodes back to back.

5. Apparatus as claimed in claim 2 wherein the comparator is a differential amplifier.

6. Apparatus as claimed in claim 2 wherein the reference D.C. voltage source is adjustable.

* * * * *